J. N. Lyman.

Cutting Veneers.

No. 3,799. Reissued Jan. 18, 1870.

Witnesses.
A. Lellere,
A. Kummer.

Inventor.
John N. Lyman.

N. PETERS, PHOTO-LITHOGRAPHER, WASHINGTON, D. C.

United States Patent Office.

JOHN N. LYMAN, OF NEW YORK, N. Y.

*Letters Patent No.* 84,637, *dated December* 1, 1868; *reissue No.* 3,799, *dated January* 18, 1870.

IMPROVEMENT IN STAY-LOG FOR CUTTING VENEERS.

The Schedule referred to in these Letters Patent and making part of the same.

*To all whom it may concern:*

Be it known that I, JOHN N. LYMAN, of the city, county, and State of New York, have invented a new and useful Improvement in Stay-Logs for Cutting Veneers, of which the following is a full, clear, and exact description, reference being had to the accompanying drawings, forming part of this specification, and in which—

Figure 1:
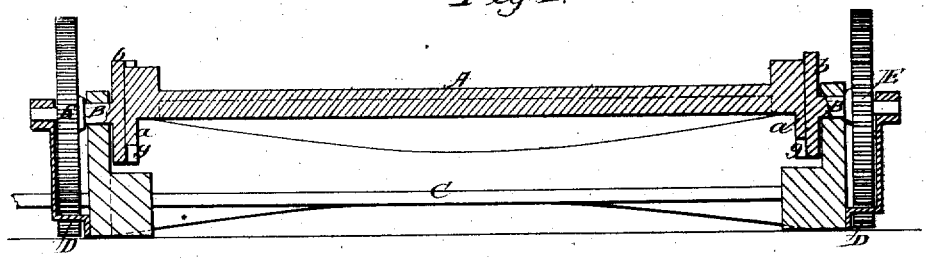
Figure 2:
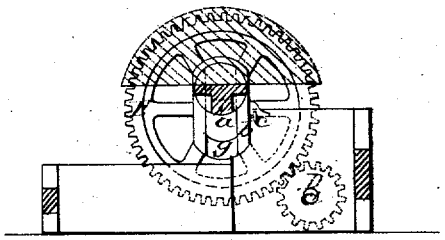

Figures 1 and 2 are vertical sectional views, taken at right angles to each other, of a revolving stay-log, constructed in accordance with my invention.

Similar letters of reference indicate corresponding parts in both figures.

This invention consists in a revolving stay-log for cutting veneers, and is provided, at its extremities, with cross-pieces *a a*, which are fitted to slide within grooves *g g*, provided in the faces of flanges *b b*, on the shoulders of journals B B.

Said cross-pieces *a a* are secured, at any desirable adjustment, within the grooves *g*, by means of set-screws *c*, or by any other suitable means.

C is a shaft, passing lengthwise of the machine, and to which the driving-power is applied, and by which rotary motion is imparted to the holding-bar A, by means of pinions D D, secured upon the ends of said shaft, and gearing with cog-wheels E E upon the journals B B of said holding-bar.

By this application of power to both ends of the holding-bar A, a better result is obtained, by the prevention of torsion, or any tendency thereto, of the said holding-bar.

In the operation of this invention, the timber or log is first divided longitudinally, preferably, into two equal parts, as nearly as is practicable, and the flat surface of a section, thus formed, screwed, or otherwise secured, to the flat surface of the holding-bar A, substantially as in stay-logs of the ordinary construction.

The said holding-bar A is then adjusted, relative to its journals B B, by the sliding of the cross-pieces *a a* inward or outward within the groove *g g*, to or from the axial centre of said journals, so that the outer or convexed surface of the log or section of timber may revolve, with its periphery at a more uniform distance from the knife or cutting-edge, or that the veneers may be cut concentric, or as nearly so as may be desired, with the natural rings of the tree. In this adjustment, the face of the stay-log, to which the log is attached, may be brought to position coincident with the axis of the journals B B, or even behind the said axis.

By this improvement much timber is saved, which is otherwise lost by the employment of the ordinary stay-log, in cutting veneers from logs whose entire circumferential surfaces are not equidistant from the axial centre of the holding-bar.

When the section of timber has been turned toward the knife, to a degree sufficient to take off a veneer from its peripherical surface, the motion of the machine need not be reversed, as in the operation of the ordinary stay-log, but its forward motion continued, and the necessary adjustment or "set" given to the knife, while the rear or opposite side of the holding-bar A is being revolved upon that side.

By this improvement, a better opportunity is afforded for the satisfactory "set" or adjustment of the knife, and with less consumption of time.

What is here claimed, and desired to be secured by Letters Patent, is—

The stay-log, constructed substantially as herein described, to provide for the adjustment of the log, relatively to the journals or axis of its revolution.

JOHN N. LYMAN.

Witnesses:

FRED. HAYNES,

HENRY PALMER.